July 25, 1967  D. C. McLEAN  3,332,244
REINFORCING BOLTS
Filed Oct. 28, 1964  3 Sheets-Sheet 1
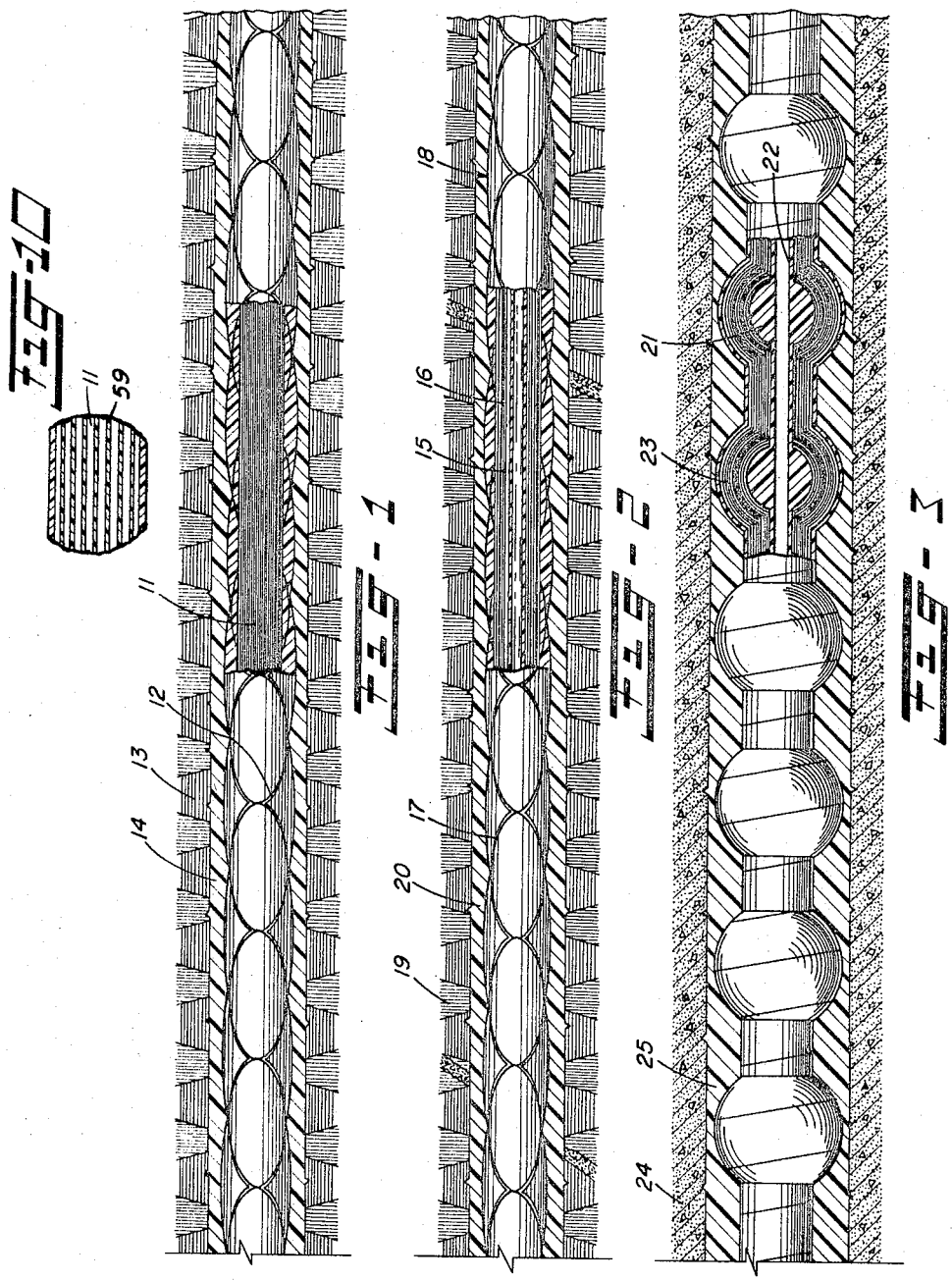
INVENTOR.
DANIEL CHALMERS McLEAN
BY
ATTORNEY July 25, 1967   D. C. McLEAN   3,332,244
REINFORCING BOLTS
Filed Oct. 28, 1964   3 Sheets-Sheet 2

INVENTOR.
DANIEL CHALMERS McLEAN
BY
Samuel Branch Walker
ATTORNEY

July 25, 1967  D. C. McLEAN  3,332,244
REINFORCING BOLTS
Filed Oct. 28, 1964  3 Sheets-Sheet 3
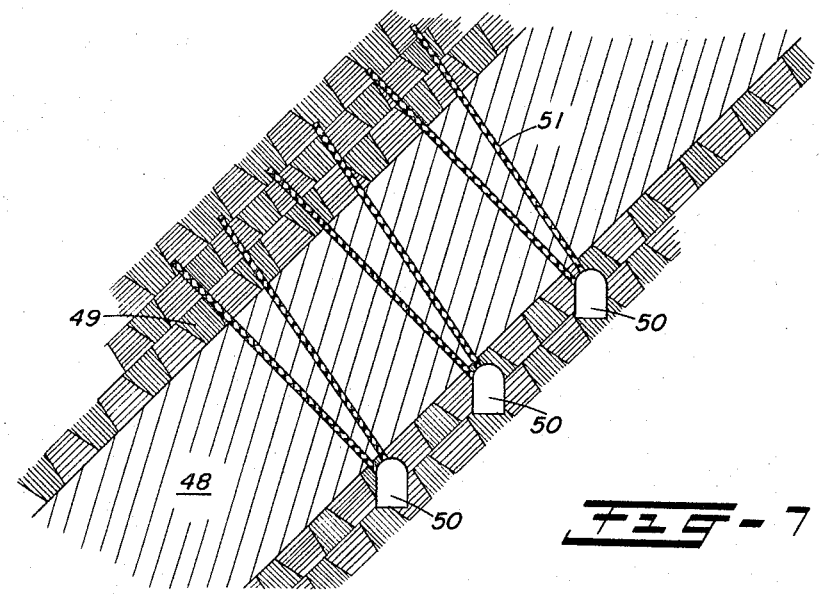
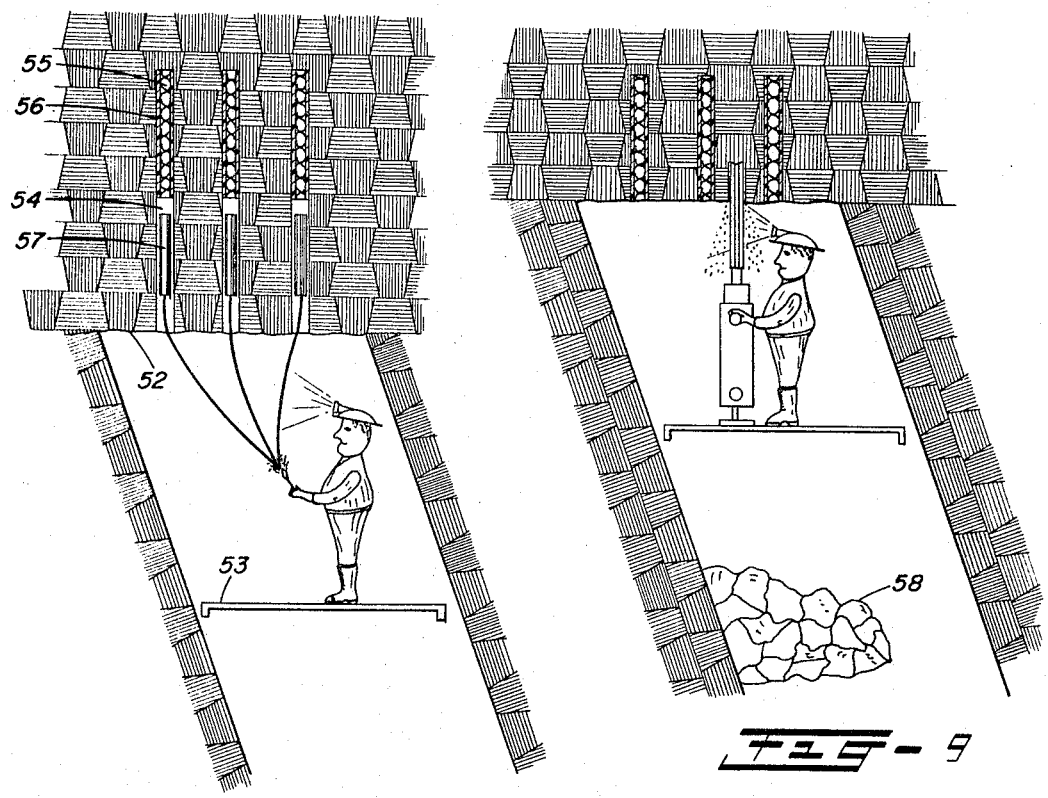
INVENTOR.
DANIEL CHALMERS McLEAN
BY
ATTORNEY United States Patent Office 3,332,244
Patented July 25, 1967

3,332,244
REINFORCING BOLTS
Daniel Chalmers McLean, Stamford, Conn., assignor to American Cyanamid Company, Stamford, Conn., a corporation of Delaware
Filed Oct. 28, 1964, Ser. No. 407,205
15 Claims. (Cl. 61—35)

This application is a continuation-in-part of application Ser. No. 403,245, filed Oct. 12, 1964 and an improvement over application Ser. No. 317,563 filed Oct. 21, 1963.

This invention relates to engineering structures, elements therefor, and methods of making the elements and structures, consisting of (1) a first structural element of brittle material, comparatively weak in tension, such as concrete and related materials, including neat cement, plaster of Paris, cement grout, rock, including weathered concrete and rock, and having as (2) a second structural element, strong in tension, a tension reinforcing member of fiber-glass, including one or more rods or bolts or other shapes for reinforcing rock and concrete, both above and below the ground, consisting of a plurality of glass fibers adhesively united to each other with an organic polymer to form one or more plies, which tension reinforcing members have unusual shock and energy absorbing characteristics by virtue of the specific gravity being much closer to that of the concrete and rock than conventional reinforcing bars and rods of steel and by virtue of the viscoelastic properties of the organic polymer and which tension reinforcing members are unusually resistant to corrosion from salt water, acidic water, and atmospheric components, and which fiber-glass tension members have at least a slightly uneven surface to permit mechanical keying to the brittle material being reinforced; and which fiber-glass reinforcing tension members give warning of incipient failure on approaching full load by the emission of popping noises or pinging, which can be picked up by the human ear or picked up by microphones and suitably amplified, including the use of such fiber-glass members in restricted quarters in which insertion is simplified by virtue of flexibility; and which tension members have a greater tensile strength than conventional steel reinforcing bars, and a much lighter weight.

In the past in reinforcing concrete or underground rock the question of incipient failure has been based upon catastrophic prior experience and comparatively large factors of safety have been required because there was no convenient method of determining incipient failures. Also, both concrete and underground rock structures are unusually sensitive to stress waves because of the inhomogeneity of the materials.

The rigorous mathematical treatment of the propagation of stress waves in solids involves second order differentiation operators and advanced mathematics, even where simplified by the assumptions of homogeneity and an isotropic solid in simple geometrical shapes. A rigorous mathematical treatment is not reasonably practical in non-homogeneous and/or anisotropic solids of complex configuration, such as reinforced concrete structures and rock reinforced with tension members. Diverse shapes, cracks, thermal and/or setting strains and prior history all aid in rendering a rigorous mathematical treatment more difficult.

Certain types of propagation of energy waves in solids are discussed in the monograph "Stress Waves In Solids" by H. Kolsky, Clarendon Press, Oxford, 1953. Another paper by the same author appears as the chapter, "Experimental Wave Propagation in Solids, Proceedings of the First Symposium on Naval Structural Mechanics," edited by J. N. Goodier and N. J. Hoff, Pergamon Press, New York, 1960. Other papers in the same collection are also hereby incorporated by reference.

The use of glass fibers to reinforce is disclosed in U.S. Patent 2,921,463, S. Goldfein, "Concrete Structural Element Reinforced With Glass Fibers," Jan. 19, 1960.

It has now been found that unusually useful engineering components may be constructed using fiber-glass resin tension members.

"Talking members" are formed by adhesively uniting small glass fibers to each other to form fiber-glass rods, which term as herein used is to include fiber-glass substitutes for underground rock bolts and reinforcing members which are not necessarily round and which may be made of a number of plies, either twisted, woven, braided, or in loose association, and which may have injection tubes therein, or bulbous construction to interlock mechanically and which preferably are surface roughened to interlock mechanically as tension elements. In adhesively uniting, polymers such as polyester, epoxy, cyanoacrylates, and copolymers of polyesters and acrylates, as well as other strong viscoelastic adhesive polymers as they become commercially available are useful. At times the glass fibers themselves may be treated to increase adhesion using methods familiar to those in fiber-glass construction activities. The adhesive to unite the fiber-glass may either be one which sets at room temperature or one which sets on heating. Preferably, the glass fibers are essentially parallel, and separated to prevent undue glass to glass contact by the polymer.

The reinforcing members are conveniently used as would steel bars be used for reinforcing concrete or as bolts would be used for reinforcing rock formations. In either concrete or rock the tension member may be stressed before or after emplacement so as to yield a pre-stressed structure. The fiber-glass members may be stressed first and concrete poured around them or they may be placed in concrete or rock structures in such a fashion that tension is applied after emplacement, which tension is released or transferred to the structure if external clamping arrangements have been used to induce the tension. It is frequently convenient to place the fiber-glass tension member and stretch it against either the rock or concrete in which it is to be permanently embedded, using a polymer or cement grout or other hardenable material as a matrix to lock the tension member in place and after hardening the initial tension is released so that there is tension throughout and the end attachment may be removed. Such is particularly convenient in underground rock where the ends of the reinforcing members, if projecting, form hazardous projections.

The use of a plurality of comparatively smaller sized fiber-glass members is particularly convenient in restricted quarters. For example, a group of 7 to 49 smaller bars, for instance ⅜₆″ diameter fiber-glass reinforcing members can be attached to a header and inserted in an underground hole or a hole in concrete where the flexure of the plied article permits insertion under conditions not otherwise possible. For example, a 60′ reinforcing rod may be placed at an angle of from 60° to 90° with the axis of a 7′ tunnel in rock as the fiber-glass plies are sufficiently flexible to be bent into the hole drilled in the rock and yet develop full strength when locked in place with either cement grout or a polymer. Such type of construction is particularly useful where plastic tubes, for example polyethylene or polypropylene, are used to bleed air from the hole or inject a polymer or grout to the far end of the hole and by grouting 2′ or 3′ of a 60′ fiberglass reinforcing member and permitting setting, the entire member may then be stressed and then finally grouted in place by using cement grout or a polymer as a matrix to completely fill the hole locking the reinforcing member in place, after which the stretching devices may be removed and in underground formations where the reinforced rock body is worn away, the reinforcing member may be worn away with the rock without portions protruding and thereby causing undesirable vibrations from impacting material as would be the case with steel reinforcing members, and without such protruding portions causing a safety hazard. At all times the brittle member is under compression from pre-stressing.

The use of flexible reinforcing fiber-glass members is particularly advantageous in reinforced concrete where reinforcing is to be carried around curves as in arches or in reinforcing a floor to a column or beam in a concrete building, as in post and lintel construction. Whereas in the past reinforcing concrete rods had to be bent to shape, frequently in powerful forming presses, the smaller plied fiber-glass members may be conveniently emplaced by hand thus saving on placing labor and permitting full strength to be developed without transfer of stresses from one rod to another as has frequently been required in steel because of placement conditions.

Fiber-glass reinforcing bars are several times as strong as steel on a weight basis, and hence lighter structures may be built which are just as strong as the steel prior art types. Because energy transfer in energy wave propagation is so different, and different types of structures and usages give different figures, comparative results are illusory—but fiber-glass rods are frequently from two to three times as strong as ordinary steel reinforcing rods.

Additionally, fiber-glass rods are electrically inert permitting free propagation of radio waves, and avoiding the shielding effect of steel reinforced concrete structures. Thus fiber-glass rod reinforced concrete can be used for radio and TV antenna towers.

An additional advantageous use of fiber-glass tensioning members, which may be locked in place, is in underground mining, for example in working with hanging walls or overhead roof structures. For example, in an overhead roof structure it is expedient to drill 14′ holes and insert 6′ to 8′ of fiber-glass tension members which are adhesively united with the rock structure using a polyester or epoxy or other resin formulation which is then permitted to harden and after it has hardened the remaining portion of the hole may be used as a blasting hole for explosives, which permits the lower end of the face to be shot but leaves an overhead reinforced rock roof to protect the miner. The method has the additional tremendous advantage that the ore is free from tramp iron when processed.

The present invention is further illustrated by the examples following, delineated by the appended claims and illustrated in the attached drawing in which:

FIGURE 1 is a view of a solid fiber-glass reinforcement rod in rock.

FIGURE 2 is a view of a fiber-glass reinforcing bar having a small vent tube in the fibers.

FIGURE 3 is a view of a fiber-glass reinforcing rod in which the central tube has bulges to give a bulged interlocking configuration of the outer surface of the reinforcing bar.

FIGURE 7 is a diagrammatic sketch of long reinforcement holes being used from a small drift in underground mining with long multiple-ply reinforcing members emplaced in solid rock to support a hanging wall adjacent an ore body.

FIGURE 8 shows the emplacement in overhead drill holes of short reinforcing elements followed by explosive charges to permit the pre-reinforcing of a roof prior to blasting of an ore body.

FIGURE 9 shows the same mine structure after a part of the ore body has been blasted loose.

FIGURE 10 shows an enlarged detail portion of the fiber-glass reinforcement rod of FIGURE 1.

Figure 4A:
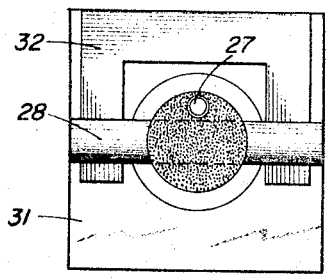
FIGURE 4A is an end view of the clamp used thereon.
Figure 5A:
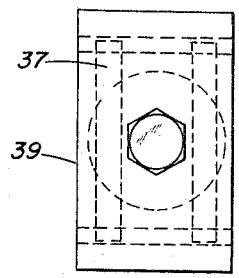
FIGURE 5A is an end view of the clamping member used in conjunction therewith.
Figure 6A:
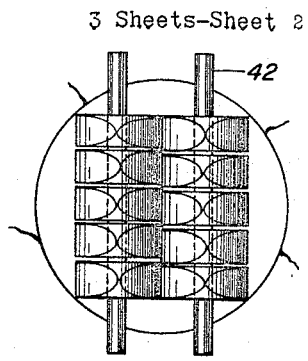
FIGURE 6A is an end view of the clamping arrangements thereof.

As used herein, the term "engineering structure" refers to any structure whose stress and strength characteristics are reasonably calculable by engineering methods and, more specifically, it covers, but is not limited to structures of either concrete or rock. Concrete includes the ordinary Portland cement, sand-gravel combinations as well as some of the less usual combinations of cement and sand. Rock includes the naturally occurring sedimentary or igneous rocks in formations such as may naturally occur. Other materials of a brittle nature, including plaster of Paris, brick, rubble, coarsed or uncoarsed, are less commonly used materials for engineering structures, in which reinforcing may be advantageous.

The term "hardenable material" includes neat cement and cement grout, that is mixtures of Portland cement with or without small size aggregate such as sand, silica flour, cinders, asbestos fibers or other fillers and which hardens by the action of water on standing, plaster of Paris, lime, gypsum and less commonly used brittle construction materials which harden from the action of water or carbon dioxide; and also includes polymers such as the polyesters, the epoxies, polyurethanes, urea-formaldehydes and other organic polymers which harden on standing, at ambient temperatures.

When used in connection with the bolts the term "matrix" is used to cover the hardenable material after it has hardened and may be either a special material placed in a hole in rock or in concrete which is used as the main body of a structure, or the concrete itself which is hardened around and encases the fiber-glass rod.

A "ply" is a group of glass fibers essentially oriented according to a pre-determined pattern, usually and preferably parallel, which are adhesively united and handled together. Many of the glass fiber reinforcing members are of a single ply but for operating in restricted quarters where it is necessary for the glass fiber reinforcing member to pass around a fairly sharp bend a plurality of smaller plies, in the neighborhood of from ⅛″ to ½″, are used depending on the radii of curvature required.

Glass fibers are individual single filaments of glass and are frequently in the range of 0.00023 to 0.00053 inch, depending upon commercial availability. The glass fibers are standard commercially available items and whatever is the less expensive grade for strength is normally used, sometimes a glass having unusual chemical resistance against special corresive agents is preferred. Of course, the glass must be one which can be economically spun in small sizes. The glass fibers may be surface treated in conventional manners to improve the glass to polymer adhesion.

The tension reinforcing member is frequently a solid or hollow rod and may have one or more plastic tubes for the introduction of hardenable material or escape of air from holes being filled. The rods may be built up of woven, braided, or laminated construction and preferably have a roughened surface to aid in mechanical keying as well as adhesive bonding.

The organic polymer uniting the glass fibers to each other may be the same as the polymer used for emplacing the tension reinforcing members but may be a material which requires heat to harden as a fiber-glass tension reinforcing member if manufactured externally may be subjected to fairly high temperature to cure the polymer whereas such temperature would not be practical in underground rock or concrete construction because it would be damaging to brittle material.

Suitable polymers both for forming the tension reinforcing members and the hardenable material to emplace the tension members are disclosed in some detail in the applications of which the present one is a continuation-in-part. Other polymers are known to those skilled in the art of fiber-glass construction.

Example 1

A straight fiber-glass rod was produced by combining a large number of small glass fibers with a room temperature setting commercial polyester resin by dipping a bundle of glass fibers continuously into the resin and then spirally wrapping the bundle to form a ⅞" bar with small fiber-glass bundles about ¹⁄₃₂" x ¹⁄₁₆" size spirally wrapped with about a 2" lead to hold the main group of fiberglass together while hardening and to give surface convolutions and bulges which interlock with the matrix in which placed.

As shown in FIGURE 1 the glass fibers 11 are held together by the spiral wrappings 12. FIGURE 10 is an enlarged detail of a part of the rod showing the individual glass fibers 11 bonded together with the glass fiber bonding resin 59. After hardening by holding at room temperature until the polyester had been set the rods were inserted in the rock 13 using the polyester resin 14 to hold the rods in position. After the polyester resin 14 had set to form a solid matrix; as the rock was loaded and tensile stress transferred to the rod, pinging noises were produced as the fiber-glass rod became highly stressed. The pinging could be heard in a quite room. For locations where extraneous noises could muffle, a microphone is placed adjacent the rod to pick up the pinging noises which are then amplified and carried to a loudspeaker or other warning device. With the type of load which usually occurs in the roof of underground coal mines the load on the bolts increases gradually, and a pinging warning is given before the bolts fail so that the miner is warned of impending disaster in time to get out from under the suspect roof area. Steel bolts in comparable locations give no advance indication of failure.

Example 2

As shown in FIGURE 2 the solid glass rod is formed for use in rock in which rod a polypropylene tube 15 was placed and covered with glass fibers 16 which were held in place by spiral wrappings 17 with the glass fibers being adhesively united with a commercial grade epoxy resin. The thus prepared fiber-glass rod 18 was placed in a hole in fractured granite. The polypropylene tube through the rod enabled the bleeding of air from the far end of the hole in the rock which thus permitted an epoxy resin 20 in liquid condition to be forced into the annular space between the rod and the hole in which it was inserted without air binding.

The hole in the rock in this experiment was formed with a rock drill. Obviously either rotary or impact drills may be used and the holes in the rock may be formed by other means, including ultrasonic drills, high speed rotary drills, high temperature lances, or laser beams, depending upon the equipment available and the type of rock. The most economical method is obviously used for preparing the holes.

Example 3

A bulbous reinforcing rod is prepared by stringing polyethylene balls 21 about ½" in diameter on a polyethylene tube 22 or forming such a rod from one piece which is then covered with glass fibers 23 which have been dipped in polyester resin. After hardening the bulbous rod is emplaced in concrete 24 to which it is bonded with polyester resin 25. The bulbous characteristics of the rod gives a mechanical interlocking which improves the transfer of stress between the fiber-glass tension member and the concrete compression member of the structure.

The bulbous rods may be used either with a polymer coating or directly in contact with concrete in any of the locations where steel reinforcing rods have been customarily used. This includes highways, airport runways, railroad beds, elevated or grade, dams, bridges, including support columns, beams and road surfaces, ornamental handrailings, curbs, drainage tunnels, concrete pipe, buildings, wharfs, warehouses, sea walls, and a large variety of other special classes for which reinforced concrete has construction advantages. Because the polymer coated fiber-glass is completely resistant to ordinary corrosive agents, including sea water, brine, calcium chloride, dilute mineral acids, oxygen in the air, etc., a very thin layer of concrete can be used to protect the reinforcing rod. Instead of the usual 3" or more which is required to protect rods of steel, 1" of concrete gives excellent results with fiber-glass rods. The thickness may be somewhat more or less depending upon the thickness required to transfer stress to the concrete and maintain it in position. Purely mechanical aspects are concerned as corrosion is no longer a problem. Because of greater flexibility, particularly in small sizes, reinforcing around a corner is simplified.

As used in concrete structures the fiber-glass is found to have some of the glass fibers under slightly different tension and on loading towards failure audible pinging develops. As the glass fibers slip with respect to adjacent glass fibers, or break, the audible warning permits either the decreasing of the load, where the loading is under the control of the operator, or permits the operator to take the necessary precautions to insure safety if excessive loading is not controllable.

Example 4

Figure 4:
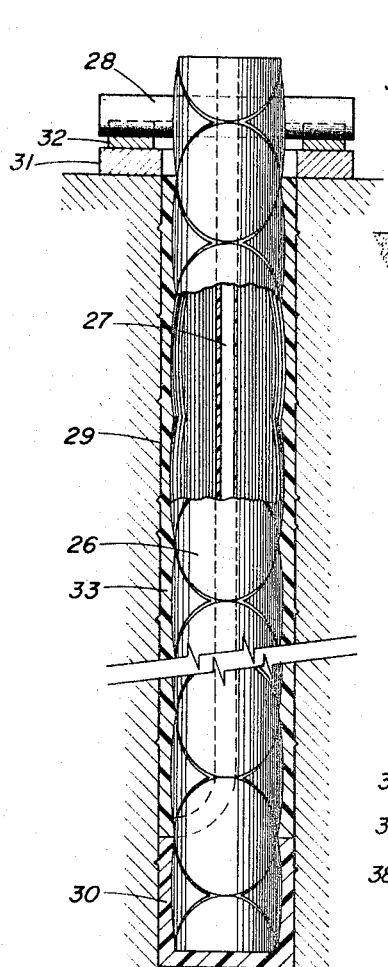
FIGURE 4 is a cross-section view of a fiber-glass reinforcing member adhesively united in place at one end and stretched before the remainder of the adhesive is poured.

As shown in FIGURE 4 a spiral glass wound fiber-glass bolt 26 is formed with a polypropylene tube 27 extending from one end to adjacent the other. As shown in FIGURE 4 the fibers are looped around one end of a stel pin 28. After hardening the bolt is placed in a hole 29 in rock and the lower end, several bolt diameters, is locked into the rock with a first polymer pour 30 which is permitted to harden in place. A collar 31 of a hard material such as steel is preplaced around the bolt at the face of the rock and a U-shaped wedge 32 is driven between the collar 31 and the pin 28, thus stressing the fiber-glass bolt. The fiber-glass bolt is stressed until incipient pull-out, as evidenced by the slight pinging as certain of the fibers begin to loosen. A known loading based on experience may be used alternatively. At this point the final polymer pour 33 of polyester resin is added. This conveniently may be done by feeding the polymer through the polypropylene tube 27 into the far end of the hole in the rock 29 until the polymer rises nearly to the surface. The addition of polymer is discontinued and the polymer is permitted to harden in place. After the final polymer pour is hardened, the U-shaped wedge 32 is withdrawn and the steel pin 28 may be removed and the collar 31 also removed. The stretched fiber-glass bolt is thus permitted to shrink which introduces compressive stresses in the adjacent rock and reduces the stress in the fiber-glass bolt. The stressed rock, that is rock in compression, is much stronger than loose rock and as a result becomes an engineering structure of more predictable properties. If a number of such bolts are placed in a rock formation so that the zones of compression overlap, a stronger retaining roof or other structure can be conveniently constructed which will predictably stand up under loading. Because a polyester polymer may be caused to set in nearly any desired time by modifying the hardener concentration, it is frequently convenient to use polyester polymers to hold the bolts in position and pre-stress the formation. A cement grout gives excellent results, partiularly if the fiber-glass bolt is more heavily convoluted and the exigencies of construction are such that time is available for hardening of the cement grout.

Whereas described particularly for rock the same type of structure can be conveniently used with concrete and because the fiber-glass bolt is stressed against the concrete in place, the concrete structure may be post-stressed saving the cost of an expensive pre-stressing bed to bear the stresses in the bolt until the concrete has set up.

As typical of the loading usable, test bars of fiber-glass using polyester bonding, with a pin at each end to permit loading stood stresses of 16,850 pounds for a ½" bar and 18,200 pounds for a ⅝" bar. In each instance the bar failed at the point of attachment. A major problem in test procedure is to obtain adequate stress transfer to the fiber-glass rod.

*Example 5*

Figure 5:
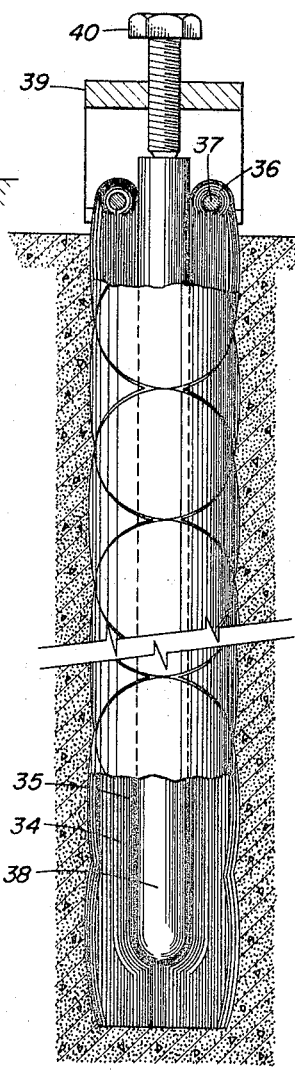
FIGURE 5 is a sectional view of a hollow fiber-glass reinforcing member with stretching loops at the end thereof in which a steel rod is placed down the center of the member to stretch the fiber-glass member as it is emplaced.

As shown in FIGURE 5 a hollow fiber-glass reinforcing member is formed from polymer coated parallel glass fibers 34. The fibers are held together by surface wrappings with one end of the glass fibers 34 being joined together to form a blind hold 35 in the glass fibers. The surface of the glass fibers is convoluted by spiral wrappings. The glass fibers are formed in loops 36 over steel pins 37. Conveniently a steel mandrel coated with a mold release agent is used to form the blind hole. After the polymer has hardened, the same mandrel, or another steel pin, is used as a metal compression member 38. A screw clamp 39 is placed over the steel pins 37 and prior to use, a screw 40 is tightened against the metal compression member, stretching the hollow fiber-glass bolt. The stressing is continued until the desired stress is placed on the fiber-glass bolt, frequently until audible warning is given of reaching the failure limit, at which time the thus pre-stressed fiber-glass bolt is emplaced. As shown in FIGURE 3 the bolt is placed in position in a concrete structure and soft concrete poured around the reinforcing bolt and permitted to harden. After the concrete has attained adequate cure the screw 40 is loosened and the screw clamp 39, steel pins 37 and metal compression member 38 are removed; after which equalization of stresses releases part of the load on the fiber-glass bolt and loads the concrete so that a pre-stressed concrete structure is formed.

This particular construction is particularly useful because it may be placed in concrete structures or holes in rock and stressed without any external clips or members under high load. Thus beams can be poured of concrete having all of the desirable characteristics of pre-stressed concrete beams but with the advantages of post-stressing, namely the avoidance of a tension bed to maintain tension on the reinforcing members until the concrete is hardened. The advantages of a bolt which is self-stressing are more obvious to those who are familiar with the difficulty of stressing steel reinforcing members and maintaining the stress while concrete is hardening around them. The lower value of Young's modulus for fiber-glass as compared with steel helps in the stress transfer. Simple engineering calculations permit designing to preferred stress values.

*Example 6*

Figure 6:
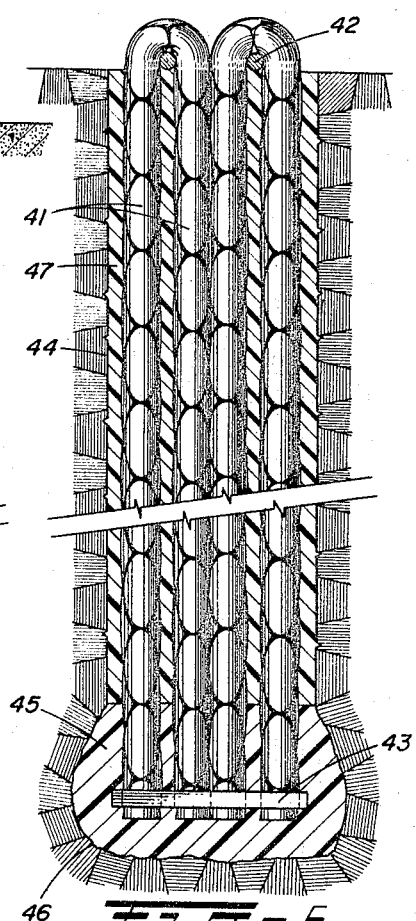
FIGURE 6 is a sectional view of a plurality of small fiber-glass members emplaced in rock with enlarged far end reinforcing, and stretched to pre-stress the structure with the advantages of pulling a plurality of flexible members.

In FIGURE 6 is shown a construction in which a plurality of comparatively small fiber-glass rods 41 are formed by looping about steel pins 42 with the ends of the fiber-glass rods away from the steel pins being locked in a retainer 43. The retainer is just a plate used to hold the ends of the rods together. As shown in FIGURE 6 a number of such rods are assembled to act as a single tension reinforcing member. Because the individual fiber-glass rods are comparatively small the assembly is flexible. The retainer end is placed in a hole 44 in rock. The far end of the rods are locked with a first polymer pour 45, preferably in an enlargement 46 at the bottom end of the hole 44. After the first polymer pour has hardened the fiber-glass rods are tensioned by pulling against the steel pins 42 and additional polymer used as a second polymer pour 47 to fill the hole to retain the fiber-glass reinforcing members in position. After the second polymer pour has hardened the pins are released and a pre-stressed structure is obtained. The hole may be filled in the second pour with either a polymer or a cement grout. The flexible members may be used in concrete but are particularly advantageous when used in rock.

Alternatively, the U-shaped members can be larger, and a separate hole drilled for each arm, thus providing a loop which is extended. By using a first pour at the far end of each hole to lock each arm, a single pin under the loop of the U tensions both arms of the U, and separate fastening members are not required. Such U construction, or even a plural M or W construction can be used on concrete with a pin at each loop. Linked loops in poured concrete furnish a convenient and economical method of post-stressing poured concrete, whether in slabs, beams or columns. The loop can be used instead of an eye-bolt.

Such loop or other fittings as shown, or their mechanical equivalents, are used to fasten machinery, particularly vibrating machinery, with the viscoelastic characteristics of the fiber-glass bolts providing shock dissipating properties.

For deep holes, polypropylene or polyethylene transfer tubes are used to introduce polymer to the bottom of holes.

*Example 7*

As shown in FIGURE 7 in a typical underground mining operation an ore body 48 is of comparatively soft ore above which is a hanging wall 49 of country rock. Near the base of the ore body a plurality of drifts 50 are driven under the ore body and long drill holes 51 are run from the drifts up through the ore body into the native rock of the hanging wall 49. In a typical mine the ore body may be 40' thick and the holes are drilled from a 7' tunnel for 60' up through the ore body and 20' into the hanging wall. The flexible glass rods, such as shown in FIGURE 6, are then inserted by bending from the axis of the drift into the holes and inserted all of the way to the far end of the holes. For such an installation polypropylene tubes are conveniently incorporated with the fiber-glass reinforcing rods so that the bottom 2' or 3' are reinforced with the first polymer pour, the fiber-glass rods are then pre-stressed and an additional polymer pour used to fill the remainder of the holes, after which the ore body may be mined with safety as the fiber-glass rods serve as reinforcement for both the hanging wall and the ore body. As the ore body is mined the fiber-glass is broken and moves with the ore. Because there is no tramp iron present, and the fiber-glass rods may be separated as the ore is subsequently treated, milling operations are simplified. Because of the reinforcement of the hanging wall the mine is a much safer place in which to operate than would have been possible with conventional mining practices. Dilution of the ore with waste rock is minimized as the roof and hanging wall remain pinned in place.

The details of relative proportions and angles are controlled by the geological formation encountered. The versatility of operations possible with flexible glass rods contributes markedly to the efficiency of mining operations.

Example 8

In a resin manufacturing kettle under an inert atmosphere of nitrogen there is mixed together:

| | Parts |
|---|---|
| Propylene glycol | 212 |
| Diethylene glycol | 67 |
| Phthalic anhydride | 280 |
| Maleic anhydride | 121 |

The mixture is heated to esterify to an acid number of 35, partially cooled 0.16 part of hydroquinone and then 320 parts of vinyl toluene are blended therewith. To the mixture is then added 1.5 parts of diethylaniline and 0.2 part of ethylene guanidine hydrochloride dissolved in diethylene glycol. About a 10% concentration of ethylene guanidine hydrochloride in diethylene glycol is used as a matter of convenience.

This resin contains both promoter and inhibitor and may be stored for up to six months at 65 to 70° F. if desired.

A mixture is prepared of 100 parts of the above resin mixture, 7 parts of water, 1 part of polyoxyethylated vegetable oil and 4 parts of pyrogenic silica. The mixture is blended together as one component of a polyester system. A catalyst paste is prepared by grinding together 9.6 parts of benzoyl peroxide and 22.4 parts of flour. To the powder is added 64 parts of Portland cement and the solids are blended; 5 parts of asbestos shorts and 20 parts of dibutyl phthalate are then added. 100 parts of the catalyst paste are mixed with 300 parts of the resin paste at the time of use.

At 45° F. the cure is completed in 24 hours; at 60° F. in 18 hours; at 70° F. in 8 hours; and at 90° F. in 1 hour.

Example 9

The above resin is inserted in underground drill holes in the wall of a rock dump chute in an ore passage. ⅞" fiber-glass reinforced plastic bars with a roughened end are inserted as they are rotated, the bar being of such length that it extends substantially completely into the hole and the resin fills the hole to the working surface. A pattern of reinforcing rods is used. As rock is dumped down the ore chute it abrades and wears the walls of the ore passage but the reinforcing rods hold the rock structure together. As the rock walls gradually abrade, the ends of the fiber-glass rods are also worn away so that metal snags from the exposed reinforcing rods do not obstruct the ore passage, as is the case with conventional reinforcing steel rock bolts in underground passages. Additionally, there are no exposed ends of the reinforcing rod to be hammered by rock and by transmitted vibration cause damage to the reinforcing rod, or the bond between the reinforcing rod and the resin or between the resin and the rock, or in the rock structure.

Example 10

As shown in FIGURE 8 in an ore body in rock ore is mined by caving from the roof 52. Using a temporary platform 53 the miner drills overhead holes 54 into the rock and inserts in the far half thereof a plurality of fiber-glass bolts 55 using the polymer 56 of Example 8 to adhere the bolts to the formation. An explosive charge 57 is then placed in the lower end of the holes and fired. This breaks the lower end of the holes from lose rock 58, as shown in FIGURE 9, which is removed by conventional practices. The miner is protected from rock falls by the fiber-glass bolts remaining in the roof, which reinforce the roof during preparation for the next blast.

Example 11

A well bonded fiber-glass rod, that is one which is about 75% glass by weight, with the fibers well wetted and bonded runs a strength of well over 100,000 pounds per square inch in tension. Mild steel is only about 60,000 p.s.i. at failure. Hence on a size basis the fiber-glass rods are much stronger than steel reinforcing rods, and with a specific gravity of about 2.1, and steel about 2½ times heavier, on a weight basis, fiber-glass rods are much superior. One problem is utilizing the full strength, as the fiber-glass bolts can fail by slippage of the surface layer of fiber from the remaining cure. A spiral wrapping with about a 1" to 2" lead, to hold the fibers together with convolution between the wrappings markedly improves the holding strength, as is shown by the following table:

| Dia. Rod (inches) | Surface | Bonded Length (inches) | Hole Diam. (inches) | Pull (lbs.) |
|---|---|---|---|---|
| ½ | Undulating | 9¾ | 1 | 17,100 |
| ½ | do | | 1 | 16,150 |
| ⅝ | Molded | 4 | | 11,040 |
| ⅝ | Undulating | 5¼ | 1½ | 21,400 |
| ⅝ with ⅛ hole | do | | 1 | 22,000 |
| ⅝ with ⅛ hole | do | 9¾ | 1 | 20,750 |
| ¾ | Smooth Surface | 4 | | 5,520 |
| ¾ | Undulating | 5½ | | 21,950 |
| ⅞ | do | | 1½ | 25,450 |
| 1⅛ | do | | 1½ | 42,450 |

The bonded length is not critical for a straight rod, as the failure occurs at a junction of the rod and the bonding, and travels as a ring failure along the rod. The undulating or convoluted surface gives superior holding, and a major increase in strength as shown in the table, and in actual commercial practice.

The above sizes are illustrative. For heavy construction, as for example reinforcing missile silos, or atomic blast resistant shelters, bolts of 20 feet or greater length and 1" to 4" diameter give excellent results. For less drastic load design, bolts of ¾" to 1¼" and 4 feet to 12 feet are more usual. The great flexibility of the product permit equal flexibility in usage.

Example 12

In an old concrete tunnel submerged under water to supply cooling sea water to a condenser for a generating station the concrete was found to be failing at the surface and throughout by corrosion of reinforcing and weakening of the concrete. 1⅛" holes are drilled at an angle of about 45° with the face of the concrete in different directions, the holes extending through the concrete. Undulated fiber-glass reinforcing rods ⅞" in diameter, long enough to extend to the bottom of the concrete and about 2" above the surface are inserted with sufficient polyester resin to fill the holes and catalyzed to cure in about 45 minutes at construction temperature. After the fiber-glass rods harden in place a mass of fiber-glass as a mat is used as a continuous lining supported by the bolts, to prevent spalling. The surface of the concrete is first coated with the polyester resin, containing cement and fine silica as a filler, the fiber-glass mat is placed in position and additional polyester resin sprayed onto the surface for a build-up to cover the glass fibers and smooth over the ends of the reinforcing rod. After curing the tunnel is protected against further spalling and corrosion.

In an additional section of the tunnel fiber-glass bolts having threads cut in the ends of the fiber-glass rods are installed at right angles to the surface by drilling holes in the rotting concrete and with the fiber-glass bolts inserted into the holes partially filled with polyester resin without unwatering. Skin divers are able to conveniently place the fiber-glass bolts because they are so light in weight. After the individual bolts harden in position, a fiber-glass sheet with drilled holes spaced to match the bolt heads is emplaced. One side of the fiber-glass sheet is coated with polyester resin, the sheets are placed over the bolts and formed fiber-glass nuts are used to draw the sheets up against the concrete which causes the fiber-glass sheets to be held in position until the fiber-glass coating hardens against the concrete. Should the fiber-glass bolts and nuts holding these sheets in position be broken off by objects moving through the tunnel the fiber-glass is adhesively bonded to the concrete and resists further corrosion and spalling. From preliminary tests and accelerated aging estimates it appears that the thus protected concrete tunnels would last for at least twenty years and perhaps indefinitely.

The ability of polyester resin to be placed and cured underwater saves the major expense of dewatering.

As is obvious to one skilled in the art the use of fiber-glass bolts, particularly pre-stressed fiber-glass bolts, which are flexible, strong and corrosion resistant opens a new area of operations. By virtue of these fiber-glass bolts giving audible warning of incipient failure, structures may be more easily stressed towards their ultimate limits as catastrophic failure can be averted by the timely warning from the glass bolts. Further, the corrosion resistance and advantageous propagation of shock waves and minimizing of wave energy reinforcement because of the greater freedom of propagation of the waves permits a more effective and efficient use of reinforcement and hence a greater safe loading and a reduction in construction costs. These and other advantages are apparent to those skilled in the art from the description of the present invention, the scope of which is as set forth in the appended claims.

I claim:

1. A reinforced structure consisting of a first structural element, weak in tension, of concrete, and a second structural element, strong in tension, consisting of a large number of fine glass fibers adhesively united with an organic polymer into a substantially cylindrical configuration placed in position to bear tensile stresses in the structure, some of the glass fibers being slightly stretched with respect to the remainder, whereby, under loading to about 75% of the ultimate strength of the fiber-glass member, localized minimal failure occurs producing a plurality of audible pings, a microphone placed to pick up said pings, an amplifier connected to said microphone, and a warning means driven by said amplifier, thereby warning of impending catastrophic failure.

2. A reinforced structure consisting of a first structural element, weak in tension, of rock, and at least one second structural element, strong in tension, consisting of a large number of fine glass fibers adhesively united with an organic polymer into a substantially cylindrical configuration placed in position to bear tensile stresses in the structure, some of the glass fibers being slightly stretched with respect to the remainder, whereby, under loading to about 75% of the ultimate strength of the fiber-glass member, localized minimal failure occurs producing a plurality of audible pings, a microphone placed to pick up said pings, an amplifier connected to said microphone, and a warning means driven by said amplifier, thereby warning of impending catastrophic failure.

3. A reinforcing tension member for brittle structures comprising at least one fiber-glass rod consisting essentially of a large number of substantial parallel, oriented, very fine glass fibers adhesively united with an organic polymer, at least one long lead spiral wrapping of a small bundle of glass fibers about said fiber-glass rod, in at least one direction, which compresses the glass fibers of the fiber-glass rod along the helical paths of the wrapping, thereby holding together the glass fibers and increasing the surface roughness of the rod, to provide increased slip resistance and mechanical keying of said rod to a reinforced structure when assembled, and which said member has a few fibers which are more loaded than others and thereby fracture first and give audible warning of incipient failure on stressing in tension.

4. A reinforcing tension member for brittle structures comprising at least one fiber-glass rod consisting essentially of a large number of substantial parallel, oriented, very fine glass fibers adhesively united with an organic polymer, and a hollow plastic tube included among the glass fibers, which tube permits the escape of air, or injection of a settable keying organic resin on installation in a hole in rock, the surface of the fiber-glass rod having nodular configuration to provide increased slip resistance and mechanical keying of said rod to a reinforced structure when assembled, and which said member has a few fibers which are more loaded than others and thereby fracture first and give audible warning of incipient failure on stressing in tension.

5. A reinforcing tension member for brittle structures comprising at lesat one fiber-glass rod consisting essentially of a large number of substantial parallel, oriented, very fine glass fibers adhesively united with an organic polymer, a hollow plastic tube included among the glass fibers, and balls of plastic on said plastic tube, and at least one long lead spiral wrapping of a small bundle glass fibers about said fiber-glass rod, in at least one direction, which compresses the glass fibers of the fiber-glass rod along the helical paths of the wrapping, thereby holding together the glass fibers and in cooperation with said balls increases the surface roughness of the rod, to provide increased slip resistance and mechanical keying of said rod to a reinforced structure when assembled, and which said member has a few fibers which are more loaded than others and thereby fracture first and give audible warning of incipient failure on stressing in tension.

6. A method of reinforcing an engineering structure of rock in an earth formation, a comparatively brittle material, weak in tension, which comprises temporarily pre-stressing at least one reinforcing member consisting of a large number of fine glass fibers adhesively united with an organic polymeric adhesive, in tension; placing an unhardened organic resin adhesive between the rock and said reinforcing member, curing the resin, thereby uniting the rock and said reinforcing member, and then after firm union, releasing the temporary pre-stress from said reinforcing member, thereby compressing said rock to form a pre-stressed reinforced structure.

7. A reinforced engineering structure comprising rock in an earth formation, a brittle material, weak in tension, and a second material, strong in tension, consisting of a large number of predominately parallel fine glass fibers adhesively united into at least one tension member, said tension member being in stress transferring relationship with the rock and under tension stress, said stress being transferred to and carried by said rock as a compressive stress, thereby forming a pre-stressed reinforced structure, and in which some of the glass fibers are slightly stretched with respect to the remainder, whereby, under loading to at least about 75% of the ultimate strength of the fiber-glass member, localized minimal failure of a few of the glass fibers occurs producing a plurality of pings, and thereby warning of impending catastrophic failure.

8. A method of reinforcing an engineering structure of rock a comparatively brittle material, weak in tension, which comprises forming a hole in said rock, forming a hollow adhesively united fiber-glass rod, one end of which hollow is closed, inserting a metal compression member in said hollow, and stretching said fiber-glass rod by compressing said metallic member and using the compressive stress on the metallic member to balance the tension stress on the fiber-glass rod, with the thus stressed fiber-glass rod in said hole, filling the space between the hole and the fiber-glass rod with a hardenable organic resin adhesive material, causing the hardenable material to harden, and after the hardenable material is substantially hardened, relieving the stress on said metallic compression member, thereby transferring the stress to the brittle material, thus forming a pre-stressed engineering structure.

9. A reinforcing tension rod for rock comprising a large number of substantially parallel oriented very fine glass fibers adhesively united with an organic polymer forming a fiber-glass rod with a hollow therein, said glass fibers being adhesively united to close off one end of said hollow, a metal compression member in said hollow, means at the other end of the fiber-glass rod bearing against said metal compression member and compressing same thereby applying tension stresses to the fiber-glass rod, and a roughened nodular external surface on the fiber-glass member to aid in mechanical interlocking as well as adhesive bonding of said fiber-glass rod when inserted into rock which is to be reinforced.

10. A method of reinforcing a naturally occurring rock formation to form an engineering structure comprising forming a hole in said rock, inserting in said hole a plurality of comparatively flexible fiber-glass reinforcing rods, placing a first pour of an organic resin adhesive at the bottom of said hole, and hardening said pour, thereby adhesively uniting the fiber-glass rods to the far end of the hole, and after said end is firmly united to said far end of the hole, then applying tension stress to said rods, and while said rods are under tension, filling the remainder of the hole with a hardenable organic resin adhesive, hardening said adhesive, and then relieving the pre-applied tension stress, thereby transferring the stress as compression to the brittle material, thereby forming a pre-stressed engineering structure.

11. A method of reinforcing the wall of an ore passage in rock, and reducing the erosion of the surfaces of said wall comprising forming a hole in the rock wall of an underground ore passage, inserting in said hole a fiber-glass bar consisting of a large number of adhesive resin bonded fine glass fibers most of which are essentially parallel, and which bar has a roughened surface, placing an unhardened organic resin adhesive in the hole between the rock and said bar and curing said adhesive; with the said bar extending substantially completely into the hole, and the said resin and bar substantially filling the hole; subsequently passing loose rock through the ore passage, with the loose rock abrading and wearing away the walls of said passage and breaking away and abrading the fiber-glass reinforcing rod as the rock wall is abraded; so that the end of the fiber-glass rod remains substantially flush with said wall and does not protrude into the ore passage which end would interfere with the passing ore, and if of metal transmit vibration and shocks through the bar, thus weakening the wall structure.

12. A method of reinforcing an underground rock structure while driving a passage through such rock structure which comprises forming a series of holes in such rock structure extending through that part in which the passage is to be driven, inserting in said holes adhesive resin bonded fiber-glass bars consisting of a large number of fine glass fibers most of which are essentially parallel, and which bars have a roughened surface, placing an unhardened organic resin adhesive in the holes between the rods and said bars, curing the adhesive, thereby reinforcing the underground rock structure, and then driving the passage through the thus reinforced rock, including said fiber-glass bars, by mining such rock.

13. The method of claim 12 in which the fiber-glass rods are pre-stressed while the emplaced adhesive is curing between the rock and the fiber-glass bars.

14. The process of claim 12 in which the bottoms only of the holes are filled with fiber-glass rods and resin, and explosive charges are placed in the near ends of at least some of the holes, and exploded, thereby loosening rock below the reinforced rock structure.

15. A method of reducing losses of life and property in structures, the failure of which structures would endanger life and property, and which structures comprise a brittle compression member and a reinforcing tension member, comprising adhesively uniting a large number of fine glass fibers with an organic polymeric adhesive, thus forming a fiber-glass tension member with some of the glass fibers being slightly stretched with respect to the remainder, placing said fiber-glass member in an engineering structure in a location to develop tensile stresses in said fiber-glass member as the structure is loaded, loading the structure, and thereby the fiber-glass member in tension, whereby individual glass fibers slip or break and thereby give pinging noises as a maximum safe load is reached, placing a microphone adjacent said fiber-glass tension member, amplifying the pinging noises, and warning personnel of danger by said amplified noises, and stopping the loading of said structure at such safe load, where feasible, and removing personnel and equipment promptly where environmental factors do not permit control of the loading, thereby reducing loss of life and property.

References Cited
UNITED STATES PATENTS
2,425,883  8/1947  Jackson _____ 52—309
2,921,463  1/1960  Goldfein _____ 52—309

FOREIGN PATENTS
DAS1,143,772  2/1963  Germany.

DAVID J. WILLIAMOWSKY, *Primary Examiner.*

JACOB SHAPIRO, *Examiner.*